(12) United States Patent
Cappadona et al.

(10) Patent No.: US 7,571,675 B1
(45) Date of Patent: Aug. 11, 2009

(54) LID FOR COOKING PAN

(75) Inventors: Richard Robert Cappadona, Boca Raton, FL (US); Jeffrey Rohrer, Kewaskum, WI (US)

(73) Assignee: Carico International, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/425,436

(22) Filed: Oct. 22, 1999

(51) Int. Cl.
*A47J 36/06* (2006.01)

(52) U.S. Cl. .............................. 99/337; 99/343; 99/344; 99/467; 220/573.1; 220/203.06; 220/231; 220/367.1; 220/912

(58) Field of Classification Search .................. 99/337, 99/344, 426, 468, 343, 467; 426/523; 220/231, 220/203.06, 912, 367.1, 573.1
See application file for complete search history.

(56) References Cited

U.S. PATENT DOCUMENTS

| | | | |
|---|---|---|---|
| 1,984,956 A | 12/1934 | Anglim | 219/40 |
| 2,099,788 A * | 11/1937 | Ames | 53/5 |
| 2,154,426 A | 4/1939 | Adams | 73/352 |
| 2,254,570 A * | 9/1941 | Hailey | 53/1 |
| 3,111,574 A | 11/1963 | Spini | 219/44 |
| 3,701,344 A | 10/1972 | Walls et al. | 126/388 |
| 3,724,360 A | 4/1973 | Kliewer et al. | 73/358 |
| 3,736,861 A * | 6/1973 | Kroyer et al. | 99/343 |
| 4,048,473 A | 9/1977 | Burkhart | 219/385 |
| 4,094,295 A * | 6/1978 | Boswell et al. | 126/25 R |
| 4,134,299 A * | 1/1979 | Rueger | 374/134 |
| 4,134,358 A | 1/1979 | Heermans | 116/137 R |
| 4,193,166 A | 3/1980 | Neff | 16/121 |
| 4,330,069 A * | 5/1982 | Bauer | 220/203 |
| 4,398,454 A | 8/1983 | Lambros et al. | 99/287 |
| 4,418,637 A | 12/1983 | Heermans | 116/70 |
| 4,509,550 A | 4/1985 | Monk | 374/147 |
| 4,509,868 A * | 4/1985 | Ronconi et al. | 374/141 |
| 4,548,156 A * | 10/1985 | Shibata | 116/70 |
| 4,552,465 A | 11/1985 | Anderson | 344/179 |
| 4,575,262 A | 3/1986 | Andersen | 374/147 |
| 4,690,095 A | 9/1987 | Walls et al. | 116/67 |
| 4,776,296 A | 10/1988 | Heermans | 116/70 |
| 4,805,188 A | 2/1989 | Parker | 374/162 |
| 4,862,552 A | 9/1989 | Remmel | 16/118 |
| 4,966,125 A * | 10/1990 | Stephen et al. | 126/25 R |
| 5,203,465 A * | 4/1993 | Baumgarten | 220/206 |
| 5,293,813 A * | 3/1994 | Schultz | 99/337 |
| 5,320,137 A | 6/1994 | Huang | 137/551 |
| 5,323,692 A | 6/1994 | Grzywna et al. | 99/342 |
| 5,537,950 A | 7/1996 | Ou-Yang | 116/217 |
| 5,771,783 A | 6/1998 | Uss | 16/110 |

(Continued)

FOREIGN PATENT DOCUMENTS

DE  7527182  * 12/1975

(Continued)

OTHER PUBLICATIONS

Rubash, Joyce, The Master Dictionary of Food and Wine, Copyright © 1996 by John Wiley & Sons, Inc., p. 418.

*Primary Examiner*—Drew E Becker
(74) *Attorney, Agent, or Firm*—Fitch, Even, Tabin & Flannery

(57) ABSTRACT

A knob assembly for a cooking pan lid that includes an improved visual and/or audible indicator of temperature conditions within the pan.

24 Claims, 3 Drawing Sheets

U.S. PATENT DOCUMENTS

| | | | | |
|---|---|---|---|---|
| 5,873,298 | A | * | 2/1999 | Chang .......................... 99/340 |
| 6,004,000 | A | | 12/1999 | Hupf et al. ..................... 116/70 |
| 6,105,810 | A | * | 8/2000 | Daenen et al. ........... 220/366.1 |
| 6,129,234 | A | * | 10/2000 | Culig et al. ............... 220/573.1 |
| 6,293,271 | B1 | * | 9/2001 | Barbour .................... 126/25 R |
| 6,647,865 | B2 | * | 11/2003 | Holl ............................. 99/339 |
| 2002/0069766 | A1 | * | 6/2002 | Paul et al. ..................... 99/366 |
| 2002/0196838 | A1 | * | 12/2002 | Lee ............................ 374/155 |
| 2003/0209551 | A1 | * | 11/2003 | Park ........................ 220/573.1 |
| 2005/0178274 | A1 | * | 8/2005 | Cartigny et al. ............... 99/337 |

FOREIGN PATENT DOCUMENTS

| | | | |
|---|---|---|---|
| WO | WO 82/03543 | | 10/1982 |
| WO | WO 92/00033 | * | 1/1992 |

* cited by examiner

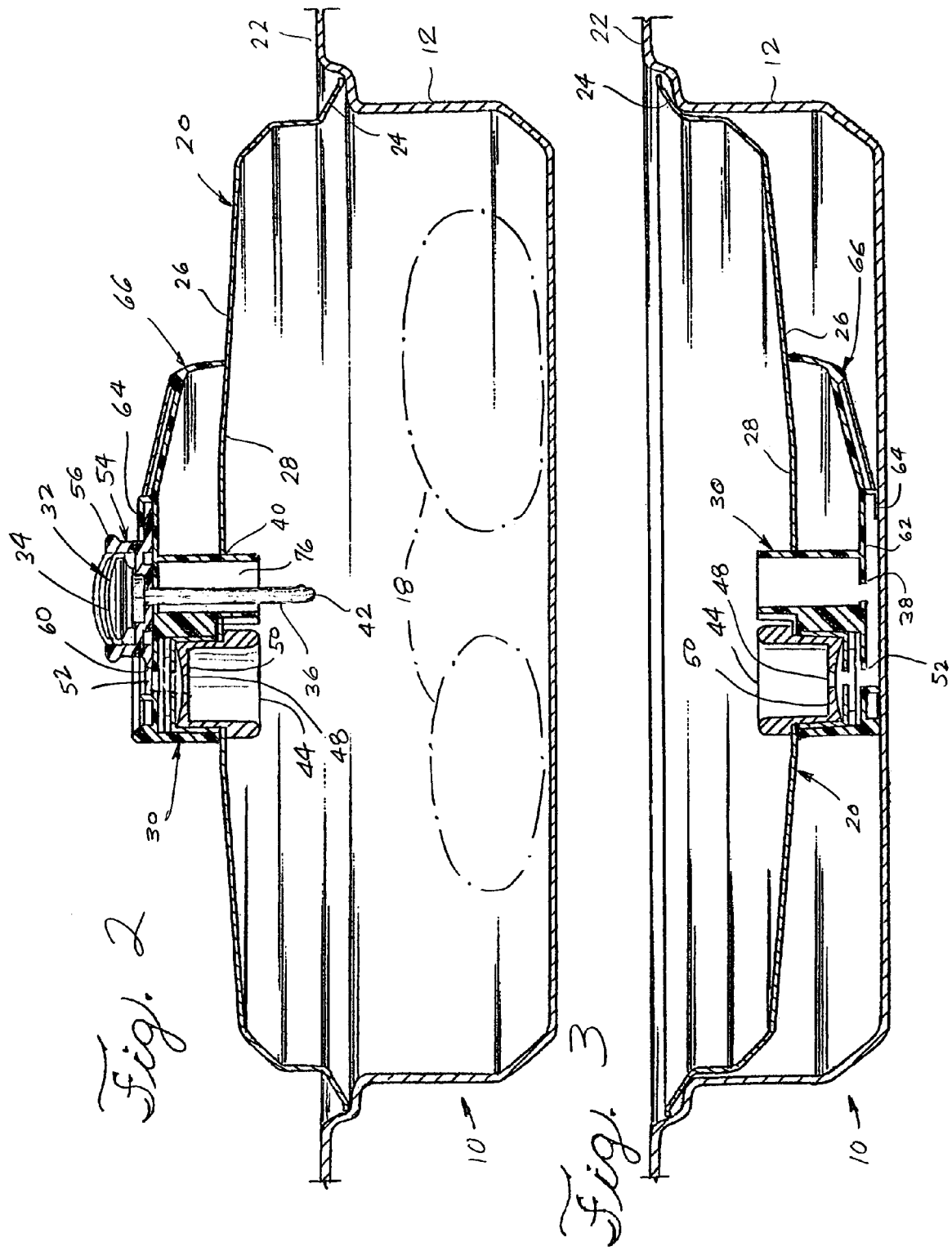

LID FOR COOKING PAN

BACKGROUND OF THE INVENTION

The invention relates generally to pans for use in preparation of food, and more particularly to a lid assembly for a pan.

In the past, cooking pans have included various means to measure and display temperature information. One approach has been to insert a thermometer probe into a food item during cooking. See, e.g., U.S. Pat. No. 5,771,783. This arrangement provides the user with an indication of the temperature at the center of the food item. U.S. Pat. No. 3,701,344 discloses waterless cooking apparatus including a knob having an indicator that changes color in response to certain temperature changes. U.S. Pat. No. 4,805,188 discloses a similar indicator for use with closed cooking vessels such as pressure cookers. Each of these indicators are mounted on the lid, and measure temperature at or near the surface of the lid. A problem with temperature indicators of this type is that they typically have a slow response time, both with respect to increasing temperature and with respect to decreasing temperature.

Another approach has been to provide an audible signal, such as a whistle that sounds in response to increased vapor pressure in the pan. A valve or the like may be provided to enable the audible signal to be deactivated. Examples of audible signals of this type are disclosed, e.g., in U.S. Pat. No. 4,690,095 and No. 4,418,637.

A general object of the invention is to provide an improved method and apparatus for providing temperature information during cooking. A further object is to provide a cooking pan and lid assembly that are suitable for commercial mass production and commercial marketing, in that they are capable of economical manufacture, capable of being cleaned without undue difficulty, and have an attractive appearance.

SUMMARY OF THE INVENTION

The invention provides a knob assembly for a cooking pan lid assembly that includes improved visual and/or audible indicia of temperature conditions the pan.

The lid assembly includes a thin-walled metal lid and a knob assembly. The preferred means for providing visual indicia comprises a thermometer having a probe extending through the lid assembly to a predetermined point beneath the lid assembly, between the food and the lid assembly. The probe preferably extends only a short distance beneath the lid, e.g., about ½ in. to 1½ in., and is not intended to contact the food items within the pan, but rather to measure the temperature thereabove. This arrangement enables the probe to measure temperature within the pan interior directly, and to be rapidly responsive to temperature changes. Temperature is visually indicated on a lid-mounted gauge affixed to the probe. The gauge may comprise a rotary mechanical needle associated with a dial, an electronic digital readout, or other suitable display arrangement.

The audible indication of temperature information is preferably provided by a whistle that provides an audible signal when water in the pan boils, or approaches boiling. The whistle preferably has a threaded body that engages a bore in the underside of the knob body from beneath the lid to act as a fastener securing the knob assembly in place, in addition to performing its audible function.

The thermometer is preferably fixedly mounted to a rotatable cap. The cap preferably has a dual function notch formed therein that operates both as a release to permit removal of the cap for cleaning, and as a valve to selectively enable and disable the whistle.

BRIEF DESCRIPTION OF THE DRAWINGS

FIG. 2 is a sectional elevational view thereof.

FIG. 3 is a sectional elevational view thereof, illustrating the lid assembly in an inverted orientation.

DETAILED DESCRIPTION OF PREFERRED EMBODIMENTS

Figure 1:
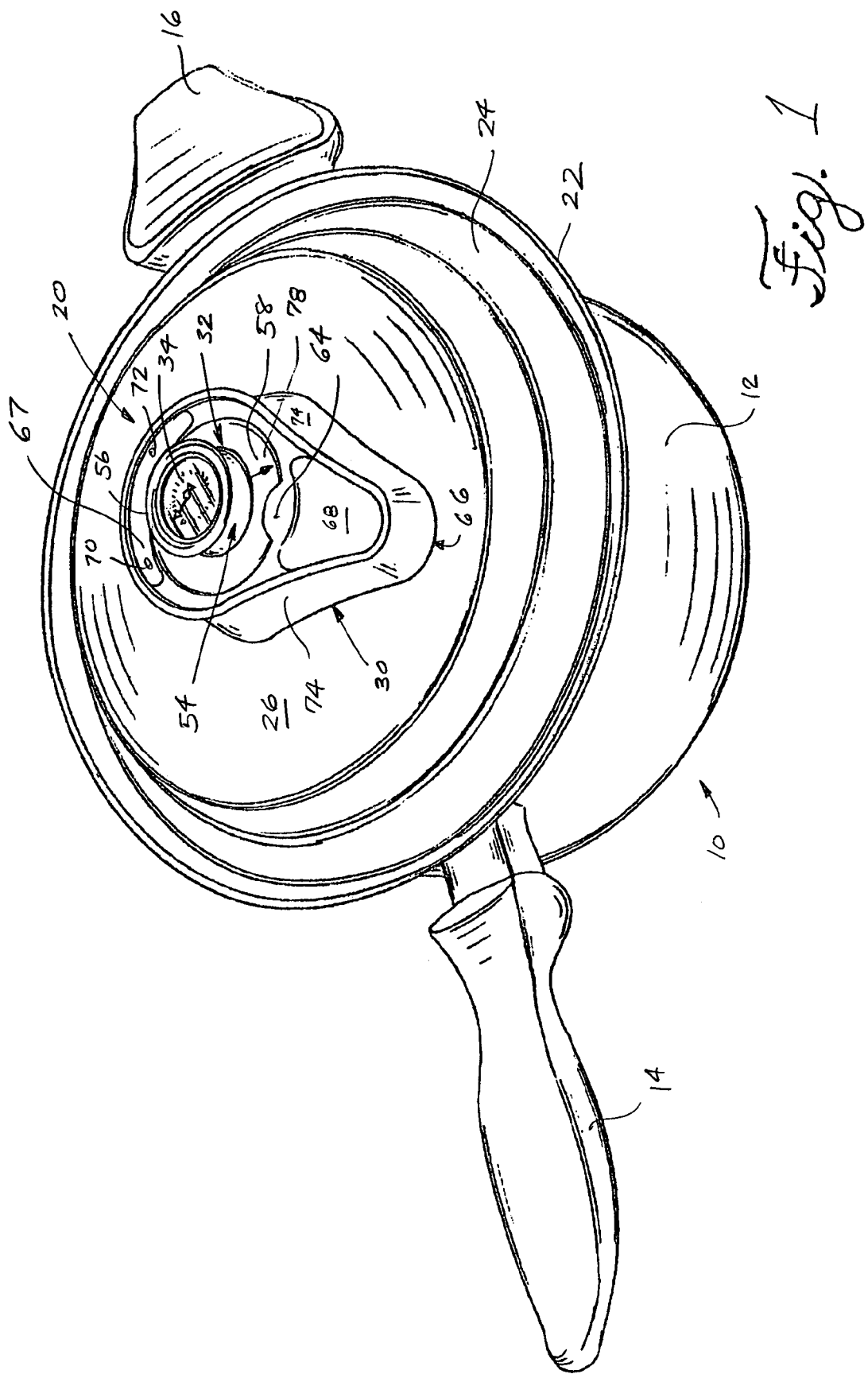
FIG. 1 is a perspective view of a cooking pan in accordance with a preferred embodiment of the invention.
Figure 4:
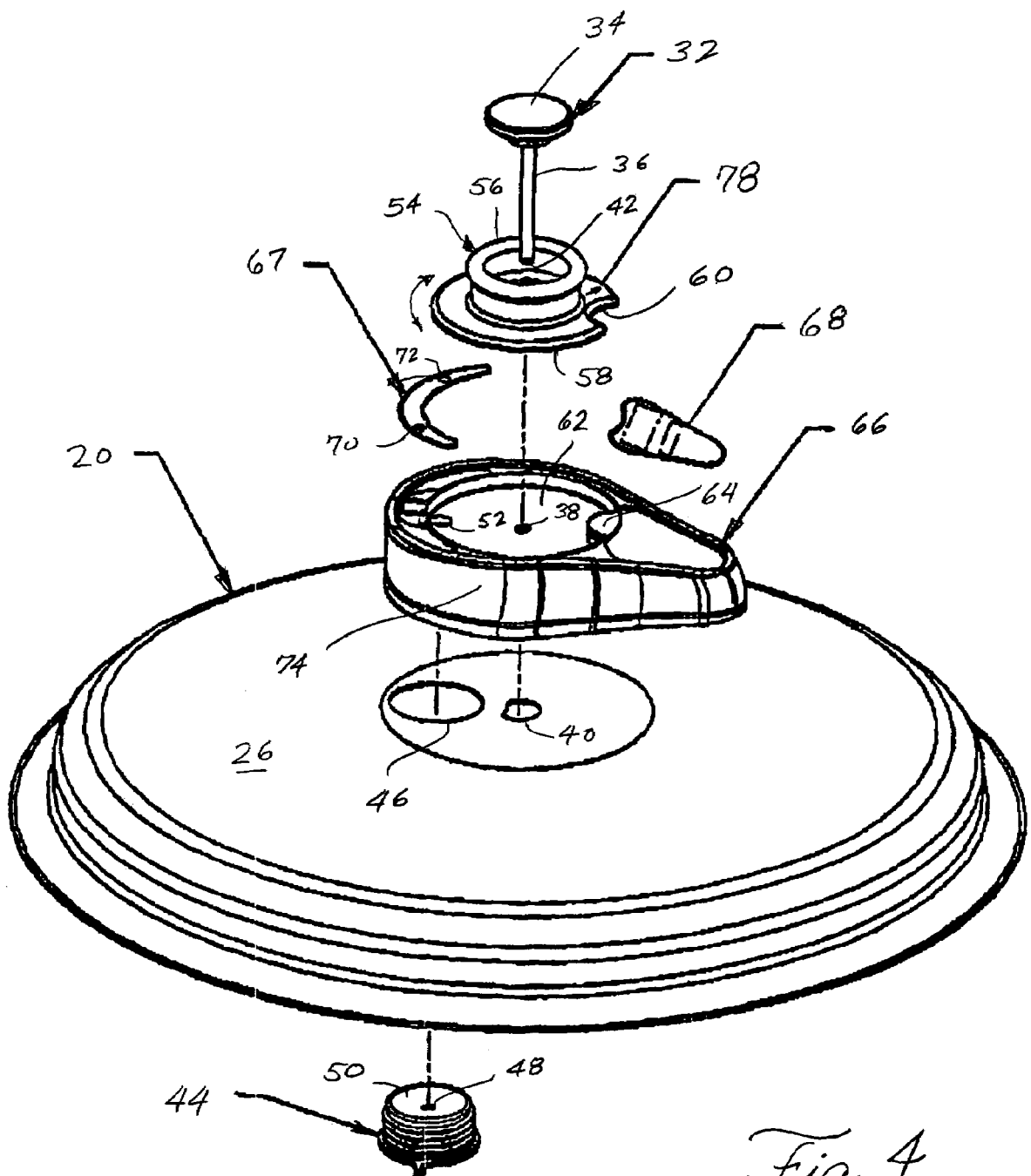
FIG. 4 is an exploded perspective view of the lid assembly.

The invention is preferably embodied in a lid assembly 20 that includes a knob assembly with one or more temperature indicating features, and in a method of using the pan and lid assembly.

The illustrated pan 10 is of a construction generally suitable for consumer in-home use as a utensil for cooking and heating food items 18, particularly in stove top cooking applications. To this end, the pan preferably includes a flat bottom wall and one or more upstanding side walls 12, along with a first elongated primary handle 14 and a shorter secondary handle 16 disposed opposite the primary handle for supporting the pan.

The pan 10 may be used for waterless cooking, steaming, boiling, or various other methods of cooking or heating food items or liquids. In one particular method of use, wet vegetables may be placed in the pan and heated, with the temperature in the interior of the pan above the vegetables being indicated by a visible display. When the temperature in the pan reaches the boiling point of water, an audible indicator sounds, and the rate at which heat is supplied to the pan is manually reduced by operation of a burner control. In other methods, other types of food items may be cooked or heated, and the temperature indicating features may be used in other ways.

The pan 10 has an upwardly opening rim 22 for stably engaging a corresponding rim 24 on the lid assembly. The lid has a generally convex upper surface 26 and a generally concave lower surface 28. The lid assembly and pan in the illustrated embodiment are of generally circular configuration. In other embodiments, the pan and lid assembly may have other shapes.

The lid assembly includes a knob assembly 30 which functions as a means to lift the lid assembly, and which also includes visible and audible means for indicating temperature. It should be appreciated that, while both visible and audible means are included in the embodiments described in detail herein, they may function independently of one another, and in other embodiments of the invention, one or the other may be eliminated.

Visible indication of temperature is provided by a thermometer 32 having a gauge 34 supported on the upper surface of the knob assembly 30. The thermometer has a probe 36 extending through an aperture 38 in the knob body 66 and through an opening 40 in the lid to a location beneath the lower surface of the lid. As illustrated in FIG. 2, the lower end 42 of the probe is disposed slightly above the elevation of the rim 24 of the lid. In this position, the probe can measure the temperature of the air and vapor in the interior of the pan above the food items 18, and thus can measure the instantaneous temperature of air and/or vapor in the pan, without its response time being delayed by the lid, by the food items, or by the knob assembly. The disposition of the tip of the probe above the rim also permits the lid to be placed flat on a counter top or other support surface without the probe contacting the supporting surface. The probe may be a thin-walled, hollow tubular structure. The bottom end 42 or tip of the probe may contain a thermocouple or other temperature sensing device connected electrically to or otherwise communicating with the gauge 34.

In the preferred embodiments, an audible indication of temperature is provided by a whistle, which may be of the type described and shown in U.S. Pat. No. 4,418,637, No. 4,776,296 or No. 4,134,358. The whistle comprises a whistle body 44 that extends upward from the lower surface 28 of the lid through an opening 46 in the lid to engage a bore in the bottom of the knob body. The whistle body may have external threads thereon for engagement with internal threads in the bore of the knob body, or may be press fit, keyed, or otherwise mechanically secured thereto. Preferably, the whistle body serves not only as an audible indicator, but also as a fastener to secure the knob assembly to the lid. The whistle body has an aperture 48 in its top wall 50 for discharge of vapor during operation of the whistle. The body 66 of the knob has a discharge opening 52 therein communicating with the whistle aperture 48.

The knob assembly 30 includes a movable holder 54 that functions both as a holder to the thermometer and as a whistle control. The movable holder 54 is preferably made of a thermally insulative plastic or other non-metallic material, or thermally isolated from the lid. The holder 54 includes a raised annular handle 56 that surrounds the thermometer gauge and is secured thereto by frictional engagement or otherwise. The holder also includes a flat-bottomed circular base 78 that has a dual function notch 60 formed therein. The notch 60 operates selectively both as a release to selectively permit removal of the holder 54 for cleaning and as a vapor discharge slot to selectively enable and disable the whistle. The holder 54 is preferably rotatable, and is supported in a circular recess 62 on the upper surface of the knob body 66. When the notch 60 is aligned with the discharge opening 52 in the knob body, vapor discharge from the whistle body is permitted, thereby enabling operation of the audible signal. When the notch is not aligned with the vapor discharge opening, discharge of vapor through the whistle body is inhibited, thus inhibiting operation of the whistle.

The knob body 66 includes a retaining member 64 that normally engages the movable member to prevent the holder 54 from being lifted from the knob body. When the notch 60 is aligned with the retaining member, however, the holder 54 may be lifted from the knob body so as to disassemble the knob assembly for cleaning.

Labels 67 and 68, such as thin metal plates with graphics thereon, may be secured to the upper surface of the knob body 66 by adhesive or other means. A crescent shaped label 67 is provided adjacent the vapor discharge opening 52 with and second indicia or graphic symbols, words or the like 70 and 72 to align with a graphic symbol 78 such as a pointer or line segment on the holder 54 to indicate whether the whistle is activated or not.

The second label 68 may include, product identifying information, or other graphics.

In the illustrated embodiment, the knob assembly has a teardrop shape as viewed in plan, and has rounded channels or finger grips 74 formed in its sides to facilitate lifting of the lid. The knob body and holder are preferably molded from a plastic material. The knob body preferably is substantially hollow and lightweight, with the thermometer probe extending through a downwardly opening cavity 76 such that the probe contacts the knob body, if at all, only at its top wall.

As shown in FIG. 3, the lid assembly may be inverted and nested in the pan, and with the holder 54 removed, and the knob body has a sufficiently low profile to allow the lid to nest in the pan, with the rim of the inverted lid resting on the pan lid.

From the foregoing, it should be appreciated that the invention provides a novel and improved lid assembly and method of use. The invention is not limited to the embodiments described above nor to any particular embodiments. The invention is further described in the following claims.

We claim:

1. A cooking vessel comprising a pan and a removable lid assembly comprising a lid having a generally convex upper surface and a generally concave lower surface and a peripheral rim, said lid assembly further comprising a knob assembly on said upper surface and defining at least one aperture through said knob assembly and said lid, said lid assembly further comprising a thermometer including a probe extending downward through said aperture and a temperature display, wherein said probe has a bottom end disposed above the rim, said probe containing a temperature sensing device disposed beneath said aperture and within said cooking vessel, wherein said knob assembly includes a whistle body that provides an audible signal in response to flow of vapor therethrough, and a movable member having a dual function notch formed therein that operates selectively both as a release to selectively permit removal of the movable member for cleaning, and as a slot for vapor discharge to selectively enable the whistle body.

2. A cooking vessel in accordance with claim 1 wherein said knob assembly further includes a knob body attached to said lid, and a vapor discharge aperture communicating with said whistle body through which vapor from the whistle body is discharged, and wherein said dual function notch is movable between a whistle-enabling position in which said notch is aligned with said vapor discharge aperture to permit discharge of vapor therethrough, and a range of whistle-disabling positions in which said notch is not aligned with said discharge aperture, such that said movable member inhibits discharge of vapor therethrough.

3. A cooking vessel in accordance with claim 2 wherein said knob body includes a retaining member, and wherein said notch is movable between a release position in which it is aligned with said retaining member and in which said movable member may be removed from said knob body, and a retained position in which said notch is not aligned with said retaining member, and said retaining member prevents removal of said movable member from said knob body.

4. A cooking vessel in accordance with claim 3 wherein said movable member is rotatable.

5. A cooking vessel in accordance with claim 4 wherein said thermometer is fixedly attached to said movable member.

6. A cooking vessel lid assembly comprising a lid with an upper surface and a knob assembly on said upper surface of said lid, said knob assembly including a whistle and a movable member having a dual function notch formed therein that operates selectively both as a release to selectively permit removal of the movable member for cleaning, and as a slot for vapor discharge to selectively enable said whistle.

7. A cooking vessel lid assembly in accordance with claim 6 wherein said upper surface of said lid is generally convex and said lid includes a generally concave lower surface and a peripheral rim.

8. A cooking vessel lid assembly in accordance with claim 6 wherein said lid assembly includes an aperture through said knob assembly and said lid, said lid assembly further including a thermometer extending through said aperture.

9. A cooking vessel lid assembly in accordance with claim 8 wherein said thermometer includes a probe extending downward through said aperture and a temperature display, wherein said probe has a bottom end disposed above said rim.

10. A cooking vessel lid assembly in accordance with claim 6 wherein said knob assembly includes a knob body attached to said lid, a whistle body of said whistle that provides an audible signal in response to flow of vapor therethrough, and a vapor discharge aperture communicating with said whistle body through which vapor from the whistle body is discharged, and wherein said dual function notch is movable between a whistle-enabling position in which said notch is aligned with said vapor discharge aperture to permit discharge of vapor therethrough, and a range of whistle-disabling positions in which said notch is not aligned with said discharge aperture, such that said movable member inhibits discharge of vapor therethrough.

11. A cooking vessel lid assembly in accordance with claim 10 wherein said knob body includes a retaining member, and wherein said notch is movable between a release position in which it is aligned with said retaining member and in which said movable member may be removed from said knob body, and a retained position in which said notch is not aligned with said retaining member, and said retaining member prevents removal of said movable member from said knob body.

12. A cooking vessel lid assembly in accordance with claim 11 wherein said movable member is rotatable.

13. A cooking vessel assembly comprising a pan, a removable lid assembly comprising a lid having a generally convex upper surface and a generally concave lower surface and a peripheral rim, said lid assembly further comprising a knob assembly on said upper surface and defining at least one aperture through said knob assembly and said lid, said lid assembly further comprising a thermometer including a probe extending downward through said aperture and a temperature display, wherein said probe has a bottom end disposed above the rim, said knob assembly including a whistle body that provides an audible signal in response to flow of vapor therethrough, and a movable member having a dual function notch formed therein that operates both as a release to selectively permit removal of the movable member for cleaning, and as a slot for vapor discharge to selectively enable the whistle.

14. A cooking vessel in accordance with claim 13 wherein said knob assembly further includes a knob body attached to said lid, and a vapor discharge aperture communicating with said whistle body through which vapor from the whistle body is discharged, and wherein said dual function notch is movable between a whistle-enabling position in which said notch is aligned with said vapor discharge aperture to permit discharge of vapor therethrough, and a range of whistle-disabling positions in which said notch is not aligned with said discharge aperture, such that said movable member inhibits discharge of vapor therethrough.

15. A cooking vessel in accordance with claim 14 wherein said knob body includes a retaining member, and wherein said notch is movable between a release position in which it is aligned with said retaining member and in which said movable member may be removed from said knob body, and a retained position in which said notch is not aligned with said retaining member, and said retaining member prevents removal of said movable member from said knob body.

16. A cooking vessel in accordance with claim 15 wherein said movable member is rotatable.

17. A cooking vessel in accordance with claim 16 wherein said thermometer is fixedly attached to said movable member.

18. A waterless cooking utensil comprising:
   a pan and a corresponding lid having an upper surface, a lower surface and a peripheral rim;
   a knob assembly positioned on the upper surface of the lid;
   at least one aperture extending through both the knob assembly and the lid;
   a thermometer having a temperature display thereon and including a probe inserted through the at least one aperture;
   the thermometer being selectively removable from the knob assembly for cleaning;
   the probe having a bottom end such that when the thermometer is inserted through the aperture, the probe bottom end extends a predetermined distance beneath the lower surface of the lid such that the bottom end thereof is disposed above the lid peripheral rim to permit the thermometer to be rapidly responsive to temperature changes within the pan;
   the knob assembly includes a recess and a separate holding base removable from the knob assembly recess, the separate holding base surrounding the temperature display of the thermometer and defining a notch therein, the separate holding base for selectively supporting the thermometer in the recess of the knob assembly; and
   the knob assembly includes a retaining flange configured to selectively cooperate with the separate holding base to permit removal of the thermometer from the knob assembly when the notch is aligned with the retaining flange and to retain the thermometer to the knob assembly when a portion of the separate holding base engages the retaining flange.

19. The waterless cooking utensil of claim 18, wherein the bottom end of the probe extends less than about 1.5 inches beneath the lower surface of the lid.

20. The waterless cooking utensil of claim 18, wherein the probe is a thin-walled, hollow tubular structure and the bottom end contains a temperature sensing device communicating with the temperature display.

21. The waterless cooking utensil of claim 18, wherein the knob assembly has a profile such that the lid may be inverted and nested in the pan where the knob assembly generally does not contact a bottom surface of the pan.

22. The waterless cooking utensil of claim 18, wherein the separate holding base is configured for receipt in the recess in the knob assembly and operable for selective removal of the thermometer without separate tools.

23. The waterless cooking utensil of claim 18, wherein the separate holding base includes a knob portion surrounding the temperature display and an outwardly extending flange portion defining the notch therein.

24. The waterless cooking utensil of claim 18, wherein the separate holding base is formed from a thermally insulative material.

* * * * *